Jan. 19, 1954   R. A. SANDBERG   2,666,338
STRAIGHT PULL BRAKE LEVER STRUCTURE
Filed Dec. 29, 1950   2 Sheets-Sheet 1
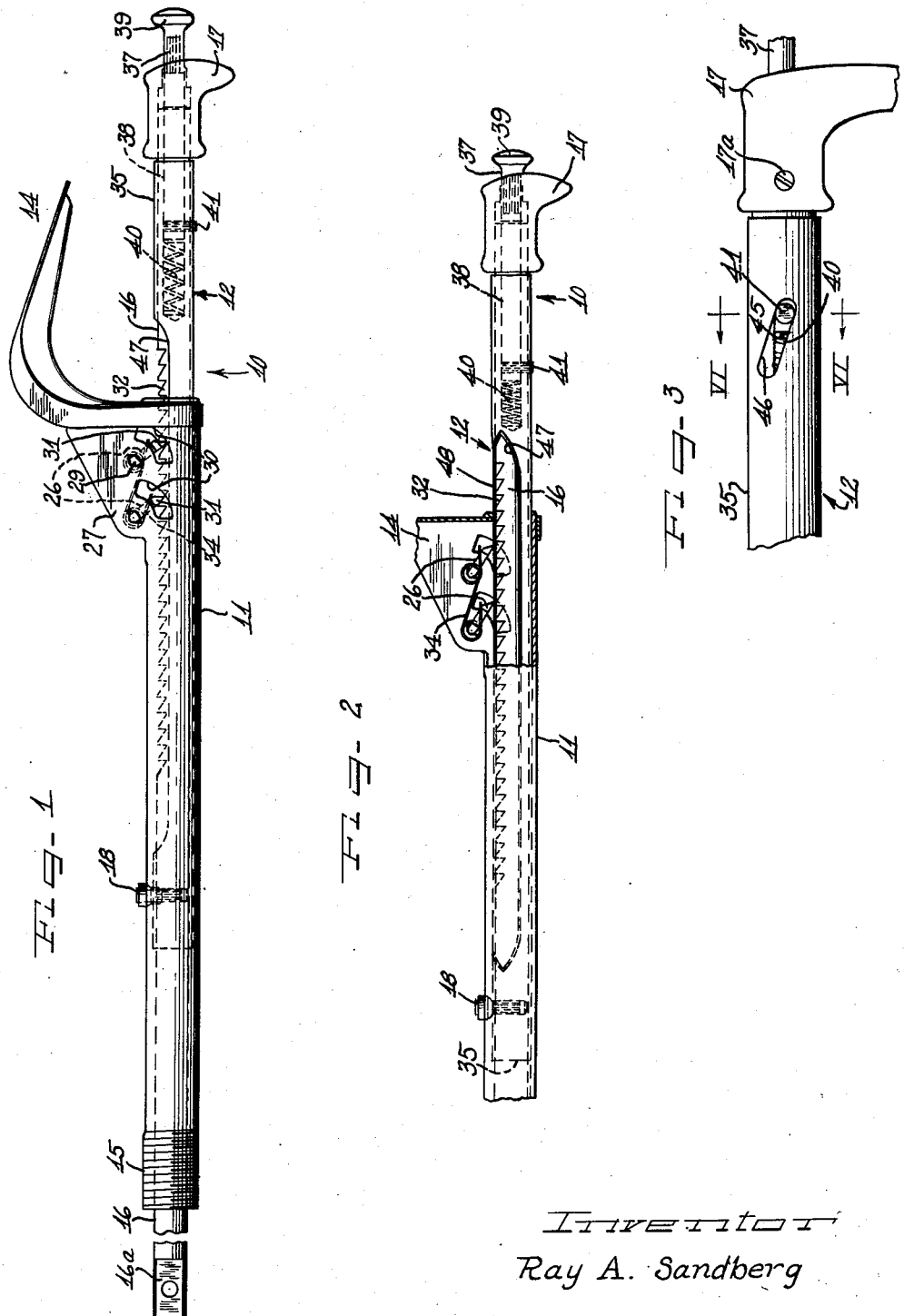
Inventor
Ray A. Sandberg

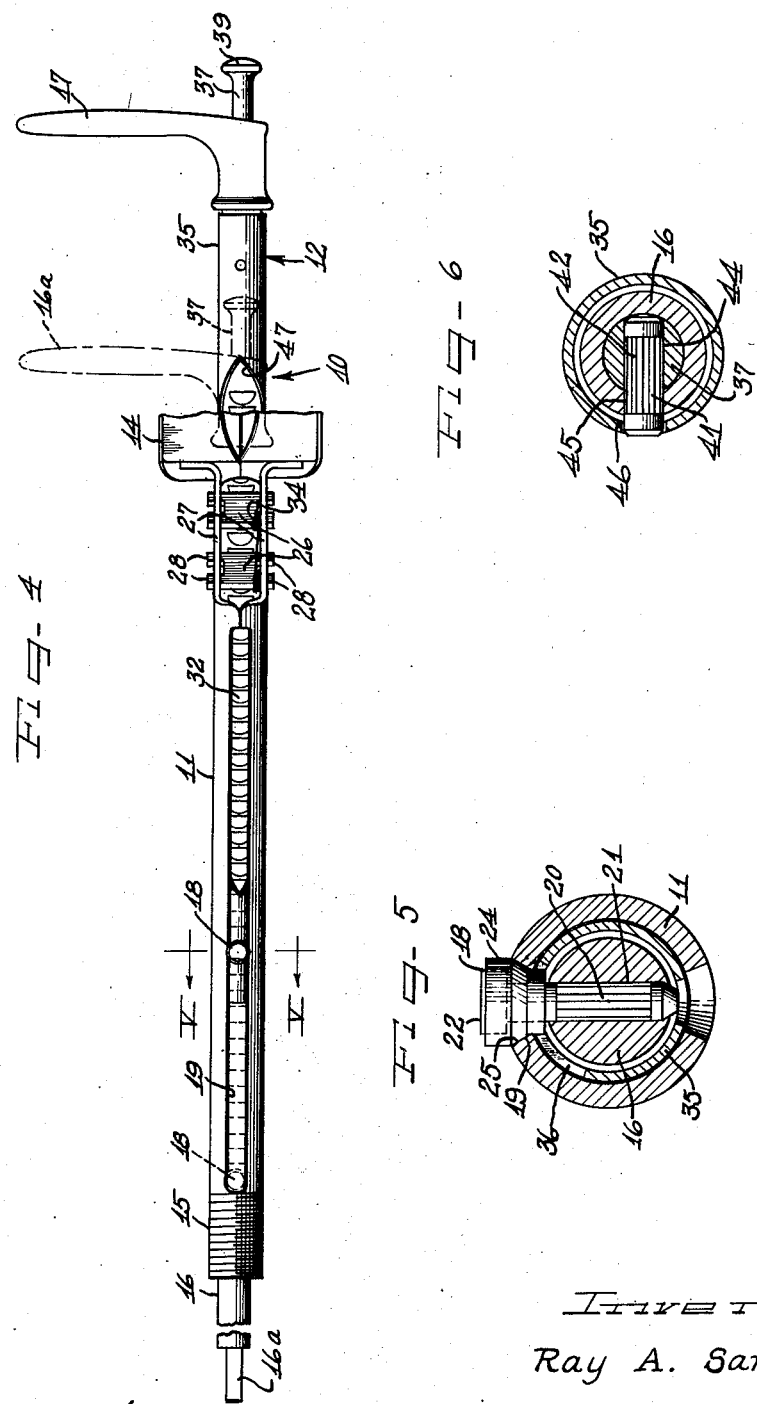

Patented Jan. 19, 1954

2,666,338

UNITED STATES PATENT OFFICE 2,666,338

STRAIGHT PULL BRAKE LEVER STRUCTURE

Ray A. Sandberg, Waukegan, Ill., assignor to Houdaille-Hershey Corporation, Detroit, Mich., a corporation of Michigan Application December 29, 1950, Serial No. 203,355

10 Claims. (Cl. 74—503)

This invention relates to improvements in brake lever assemblies and more particularly to a straight pull brake lever structure for actuating the emergency brakes of an automobile or the like.

It is readily apparent that accidental release of the emergency brake may result in damage to the particular automobile and other property and also might result in danger to human life if the automobile is parked on a hill or is started in motion by a collision.

It is, therefore, an object of the present invention to provide an improved straight pull brake lever structure embodying a safety release mechanism.

Another object of the invention is to provide an improved straight pull ratchet type emergency brake lever for an automobile or the like.

A further object of the invention is to provide an improved construction for a straight pull emergency brake lever structure including an easily operable release mechanism which is equipped to avoid inadvertent actuation.

Other objects, features and advantages of the present invention will become apparent from the following detailed description of a preferred embodiment, for purposes of illustration only, taken in conjunction with the accompanying drawings, in which:

Figure 1 is a side elevational view of a brake lever structure according to the present invention;

Figure 2 is a fragmentary side elevational view with a portion of the sleeve broken away to show the ratchet releasing action when the release plunger has been operated;

Figure 3 is an enlarged fragmentary bottom plan view showing the plunger-carried camming pin in the camming slot;

Figure 4 is a top plan view with the attachment bracket broken away and showing the released brake position of the handle in phantom outline;

Figure 5 is an enlarged sectional view taken substantially along line V—V of Figure 4 with the guide pin shown in elevation; and Figure 6 is an enlarged sectional view taken substantially along line VI—VI of Figure 3 with the camming pin shown in elevation.

A straight pull brake lever structure 10, which may be utilized for actuating the emergency brakes of an automobile, a truck or the like, has a supporting and guiding tube 11 with an actuating assembly 12 reciprocably mounted therein. At its rearward end portion the guiding and supporting tube 11 has a fixedly attached generally L-shaped escutcheon or mounting bracket 14 for attaching the brake structure to a portion of an automobile such as an instrument panel. External threads 15 are formed at the forward end of the support tube 11 for attaching the tube to another part of the automobile.

The actuating assembly 12 comprises a ratchet type pull rod 16 and an actuating member or handle 17 fixedly attached over the rear end portion of the rod 16 by means of a screw 17a. An attachment portion 16a is formed at the forward end of the rod 16 for attaching thereto a brake setting cable of an automobile emergency brake assembly.

For limiting reciprocating movement of the rod 16 within the tube 11 and for preventing rotation of the rod relative to the tube, a guide pin 18, fixedly attached to the rod 16 and extending radially with respect thereto, rides in a longitudinal guide groove or slot 19 formed preferably along the top surface portion of the support tube 11. The forward and rearward defining end portions of the slot 19 form respective forward and rearward stops for positively arresting movement of the actuating assembly 12 in conjunction with guide pin 18.

The guide pin 18 includes a straight grooved drive screw 20 with its shank portion driven into a transverse hole 21 through the rod 16 and a head 22 spaced from the rod 16 and retaining a rotary guide sleeve or roller 24 on the drive screw between the head and the rod. The guide sleeve 24 has a beveled surface 25 substantially complementary to the adjacent side walls of the slot 19.

Ratchet means are provided for allowing rearward or brake setting movement of the actuating assembly 12 but preventing forward movement thereof when the means are engaged. Herein such means comprise a pair of ratchet detents or pawls 26 pivotally attached between a pair of upstanding parallel integral flanges 27 formed on the guide tube 11. The ratchet pawls 26 have a pair of oppositely formed legs or flanges 28 extending transversely from each end portion thereof with the upper flanges pivotally connecting the pawls by extending through opposed apertures 29 formed through the tube flanges 27. The lower pawl flanges 28 are freely movable in arcuate slots 30 permitting the pawls 26 to pivot about the upper pawl flanges 28 to allow lower wedge-shaped end portions 31 of the pawls to resiliently engage ratchet teeth 32 formed along the top surface portion of the pull rod 16. The ratchet pawls 26 are resiliently urged downwardly into ratchet engagement with the ratchet teeth 32 by a wire spring 34 wound about corresponding upper pawl flanges 28. It will be noted that the pawls 26 are disposed in tandem relation and are so spaced as to provide alternate engagement and disengagement with successive ratchet teeth 32 in order to provide a relatively fine degree of adjustment.

According to the present invention, brake release means are provided to allow easy intentional disengagement of the ratchet pawls 26 from the ratchet teeth 32 and to substantially prevent inadvertent disengagement thereof. Herein such means comprise a ratchet release sleeve 35 pivotally retained over a portion of the length of the pull rod 16 by means of the guide pin 18 which is disposed in a transverse arcuate guide slot 36 formed in the forward end portion of the sleeve 35. Pivoting of the sleeve 35 with respect to the rod 16 is permitted to the extent of the length of the guide slot 36, and reciprocating movement between the sleeve and the rod is prevented by cooperation between the guide pin 18 and the walls of the slot.

To provide actuating means for pivoting the ratchet release sleeve 35, a ratchet release plunger 37 is reciprocably mounted in a longitudinal rearwardly opening bore 38 formed in the rearward end portion of the rod 16. The plunger 37 has an integral enlarged safety release knob or button 39 formed at its rearward end free of the handle 17. The plunger 37 is resiliently urged rearwardly by a compression spring 40 disposed between the forward end of the plunger and the closed end or bottom of the bore 38.

For cooperating with the sleeve 35 to rotate or turn the same into pawl releasing position, a camming pin 41 has a straight grooved portion 42 driven into a transverse aperture 44 in the plunger 37. The distal end portion of the camming pin 41 is slidably disposed in a short longitudinal slot 45 formed through the bottom wall portion of the end portion of the rod 16 containing the bore 38. Thus, the plunger 37 is prevented from pivoting with respect to the rod 16 and is permitted limited longitudinal travel with respect thereto. A short spiral camming slot 46 is formed in the lower surface portion of the sleeve 35 and retains the distal end portion of the camming pin 41 in slidable relation therein. Thus, forward movement of the plunger 37 will urge the camming pin 41 forwardly in the slot 45 to pivot the sleeve 35 by cooperation between the camming pin 41 and the defining edges of camming slot 46.

In order to permit unimpeded longitudinal movement of the actuating assembly 12 with respect to the support tube 11 and to effect disengagement of the ratchet pawl 26 from the ratchet teeth 32 in any position of the actuating assembly for releasing the vehicle emergency brakes, a longitudinal slot 47 is provided along the upper surface portion of the sleeve 35 to normally expose and clear all of the teeth 32 and the pawls 26. A straight defining edge portion 48 of the slot 47 is disposed adjacent the ratchet pawls 26 when the ratchet release sleeve is in the inactive position. Actuation of the plunger 37 to rotate the sleeve 35 engages the edge portion 48 with the wedge portions 31 of the pawls 26 to disengage both of the pawls from the ratchet teeth 32 as shown in Figure 2. When the plunger 37 is held in the actuated position, the actuating assembly 12 may be moved forwardly toward brake-releasing position without interference by the ratchet mechanism.

It will be understood that the attachment portion 16a of the pull rod 16 will have a forward tension exerted thereon by the emergency brake mechanism (not shown), and the ratchet pawls 26 will oppose this force to prevent movement of the actuating assembly 12 by cooperation with the ratchet teeth 32 when the emergency brake is in the set condition with the actuating assembly in a rearward position as shown in Figures 1 and 4. The actuating assembly 12 may be moved rearwardly to set the emergency brake without actuating the ratchet release mechanism since the pawls 26 will resiliently ride over the ratchet teeth 32 when the pull rod 16 is moved in a rearward direction.

A feature of the present invention is the prevention of accidental release of the emergency brake. When the emergency brake is in the "set" condition, it cannot be released except by turning of the release sleeve 35, requiring forward pressure on the plunger 37. However, substantial force is exerted between an engaged pawl 26 and a ratchet tooth 32 because of the forward bias exerted on the rod 16 by the emergency brake mechanism. The force between the engaged pawl and tooth is sufficient to preclude accidental disengagement by inadvertent bumping or brushing against the projecting plunger 37. In order to release the engaged pawl and ratchet tooth, one pulls rearwardly on the handle 17 to release the pressure between the pawl and the tooth and then depresses the button 39 for actuating the plunger 37 and rotating the sleeve 35.

Another feature of the invention is the ease of operation of the release mechanism once the pressure between the engaged pawl and ratchet tooth 32 has been released. No twisting of the handle or pivoting of an auxiliary release lever is necessary to release the brakes.

From the above description it will be understood that the present invention provides a simplified and easily operable straight pull brake lever for an emergency brake mechanism and embodying an efficient safety feature to preclude inadvertent release of the emergency brake when actuated. The structure described is easy to manufacture and to assemble and can be produced at a low cost. The entire brake lever structure provides a unitary subassembly for an automobile or the like.

It will be understood that modifications and variations may be effected without departing from the scope of the novel concepts of the present invention.

I claim as my invention:

1. A straight pull brake operating structure for a vehicle, comprising a support adapted to be fixedly attached to a vehicle, an actuating assembly slidably mounted in said support, ratchet means between said support and said assembly for retaining the assembly in incremental brake-setting positions, said actuating assembly including a sleeve journaled about the assembly and having an apertured portion normally free of said ratchet means, and means for turning said sleeve to move an edge of said apertured portion into releasing relation to said ratchet means to allow movement of said actuating assembly in brake-releasing direction.

2. A straight pull brake actuating structure comprising a supporting tube, a pull rod slidable in said tube and having ratchet teeth on the rod, ratchet pawls movably mounted on said tube and having end portions releasably engageable with said ratchet teeth to retain the rod in incremental brake-setting positions, a sleeve pivotally mounted about said rod and having an aperture normally exposing said ratchet teeth, and means for pivoting said sleeve to move a defining edge portion of said aperture against said ratchet pawls to release said pawls from said ratchet teeth to allow movement of said rod in brake-releasing direction.

3. A straight pull brake actuating mechanism for a vehicle, comprising a supporting and guiding tube adapted to be fixedly attached to a vehicle and having pawls movably mounted thereon, a brake actuating member slidably mounted in said tube and having ratchet teeth engageable with said pawls to retain said member in incremental brake-setting positions, said member including a sleeve journaled thereon and having an aperture normally exposing said ratchet teeth, said sleeve having a spiral camming slot, a camming pin engaged in said slot, and means for moving said pin axially with respect to said member to rotate said sleeve by action of said pin in said slot, whereby one defining edge portion of said aperture contacts said pawls to disengage the same from said ratchet teeth permitting movement of said actuating member in a brake-releasing direction.

4. In a straight pull brake actuating structure for a vehicle, a brake actuating member slidably mounted in a support and ratchet means to retain the member in incremental brake-setting positions, brake release mechanism comprising a sleeve journaled about said actuating member and having an aperture normally preventing interference between the ratchet means and said sleeve, and means for pivoting said sleeve, whereby one defining edge portion of said aperture disengages the ratchet means to permit movement of the actuating member in a brake-releasing direction.

5. In a straight pull brake operating structure for a vehicle, a brake actuating rod slidably mounted in a support and ratchet means to retain the rod in incremental brake-setting positions, brake release mechanism comprising a sleeve journaled about said actuating rod normally free of said ratchet means, said sleeve having a spiral camming slot therein, a camming pin engaged in said camming slot, and means for moving said pin axially with respect to said actuating rod to pivot said sleeve by action of the pin in said slot, whereby a portion of said sleeve is moved into releasing relation to said ratchet means to allow movement of the rod in a brake-releasing direction.

6. In combination in a straight pull brake actuating structure for a vehicle, a support and guiding tube, a brake pull rod slidably mounted in said tube and having a plurality of ratchet teeth, pawl means movably mounted on said tube and engaging said teeth to retain the rod in incremental brake-setting positions, said tube having a longitudinal guide slot with closed ends, a guide pin fixedly attached to said rod and having its distal end portion engaged in said slot to permit axial movement of said rod relative to said tube but to prevent relative rotary movement therebetween, a sleeve journaled on said rod normally free of said pawl means, and means for pivoting said sleeve to engage a portion of the same with said pawl means to disengage the pawl means from the ratchet teeth to permit movement of said rod in a brake-releasing direction the defining edges of the closed end of said slot coacting with said guide pin to form limit stops to positively arrest respective brake-setting and brake-releasing movement of said rod.

7. In a straight pull brake operating structure for a vehicle, a brake actuating rod slidably mounted in a support and ratchet means to retain the rod in incremental brake-setting positions, brake lever release mechanism comprising a sleeve journaled about said rod and having a longitudinal aperture normally preventing interference between the ratchet means and said sleeve, said rod having an axial bore in the end portion toward the direction of brake-setting movement, a plunger slidably disposed in said bore, said bored end portion having a longitudinal slot, said sleeve having a spiral camming slot therein, a camming pin fixedly attached to said plunger and having its distal end portion engaged in said longitudinal slot and in said spiral slot, whereby actuation of said plunger pivots said sleeve relative to said rod by action of the camming pin in said slots, and whereby one defining edge portion of said aperture disengages said ratchet means to permit movement of the actuating rod in a brake-releasing direction.

8. In a straight pull brake operating structure, an actuating assembly slidably mounted in a support and mechanism to retain the assembly in incremental brake setting positions, release means comprising a sleeve disposed about said actuating assembly normally free of said mechanism, said assembly having a socket in the end portion toward the brake setting direction, an actuating handle fixedly attached to said end portion, a release plunger slidably mounted in said socket, said end portion having a longitudinal slot therein, said sleeve having a spiral camming slot therein, a camming pin fixedly attached to said plunger and having its distal end portion engaged in said longitudinal slot and said spiral slot, spring means biasing said plunger toward unactuated position, whereby actuation of said plunger against the bias of said spring means pivots said sleeve relative to said actuating assembly through action of said camming pin in said slots to move a portion of said sleeve into releasing relation to said mechanism to allow movement of the actuating assembly in a brake-releasing direction.

9. In combination in brake-actuating mechanism, a pull rod having means at one end for attachment to brake mechanism and a handle at the opposite end for pulling the rod for setting the brake, means supporting the rod for reciprocal brake setting and release movements, cooperating pawl and ratchet means on said support and on said rod for holding the rod in incremental brake-setting position, means rotatably mounted relative to the rod and disposed to actuate and thereby separate said pawl means from said ratchet means for releasing from any incremental brake-setting position, and means operatively connected to said rotatably mounted releasing means and manually operable adjacent to the handle end of the rod for actuating said rotatably mounted means.

10. In a brake-operating mechanism, a pull rod having a handle at one end and means at the opposite end for attachment to a brake mechanism, means for supporting the rod reciprocably, pawl and ratchet means carried by the rod and the supporting means and co-operable to hold the rod in a plurality of incremental brake-setting positions into which the rod may be pulled rearwardly, a member slidably mounted externally of the rod, said member being operably movable relative to the rod and having an edge operable as an incident to such movement to enter into separating relation between the pawl and ratchet means to release the rod for movement in the brake-releasing direction, and means carried by the rod operably connected to said slidably mounted member and manually operable adjacent to said handle for selectively operating said slidably mounted member.

RAY A. SANDBERG.

References Cited in the file of this patent

UNITED STATES PATENTS

| Number | Name | Date |
|---|---|---|
| 637,477 | Newman | Nov. 21, 1899 |
| 1,795,520 | Steckroth | Mar. 10, 1931 |
| 1,839,908 | Weatherhead | Jan. 5, 1932 |
| 2,126,234 | Weber | Aug. 9, 1938 |
| 2,136,295 | Hansen | Nov. 8, 1938 |
| 2,190,087 | Snell | Feb. 13, 1940 |
| 2,303,586 | Snell | Dec. 1, 1942 |
| 2,362,458 | Arens | Nov. 14, 1944 |
| 2,509,202 | Arens | May 30, 1950 |
| 2,543,509 | Sandberg | Feb. 27, 1951 |
| 2,543,510 | Sandberg | Feb. 27, 1951 |
| 2,553,025 | Weber | May 15, 1951 |
| 2,557,365 | Weber | June 19, 1951 |

FOREIGN PATENTS

| Number | Country | Date |
|---|---|---|
| 50,301 | France | Dec. 1, 1939 |
| 481,199 | Great Britain | Mar. 8, 1938 |
| 595,342 | Germany | Apr. 9, 1934 |
| 699,354 | Germany | Nov. 27, 1940 |
| 755,967 | France | Sept. 18, 1933 |